(12) United States Patent
Kupratis et al.

(10) Patent No.: US 10,718,271 B2
(45) Date of Patent: Jul. 21, 2020

(54) HYBRID AMPLIFICATION OF HIGH SPOOL MOTORING VIA LOW SPOOL POWER EXTRACTION AND MOTORING OF A DIFFERENTIAL GEARED GENERATOR

(71) Applicant: UNITED TECHNOLOGIES CORPORATION, Farmington, CT (US)

(72) Inventors: Daniel Bernard Kupratis, Wallingford, CT (US); William G Sheridan, Southington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 42 days.

(21) Appl. No.: 15/992,051

(22) Filed: May 29, 2018

(65) Prior Publication Data

US 2019/0368424 A1    Dec. 5, 2019

(51) Int. Cl.
| | |
|---|---|
| *F02C 7/36* | (2006.01) |
| *F01D 15/10* | (2006.01) |
| *F16H 37/08* | (2006.01) |
| *F16H 48/08* | (2006.01) |

(52) U.S. Cl.
CPC ............... *F02C 7/36* (2013.01); *F01D 15/10* (2013.01); *F05D 2220/76* (2013.01); *F05D 2260/40311* (2013.01); *F05D 2260/532* (2013.01); *F16H 37/08* (2013.01); *F16H 37/0806* (2013.01); *F16H 48/08* (2013.01)

(58) Field of Classification Search
CPC ...... F16H 48/08; F16H 37/08; F16H 37/0806; F02C 7/36; F01D 15/10; F05D 2260/40311; F05D 2200/76; F05D 2260/532

USPC .......................................................... 475/198
See application file for complete search history.

(56) References Cited

U.S. PATENT DOCUMENTS

| | | | | |
|---|---|---|---|---|
| 6,895,741 | B2* | 5/2005 | Rago | F01D 15/10 60/226.1 |
| 7,788,898 | B2* | 9/2010 | Kern | F02C 3/113 60/204 |
| 9,200,592 | B2 | 12/2015 | Berryann et al. | |
| 2006/0225431 | A1* | 10/2006 | Kupratis | F01D 15/10 60/791 |
| 2008/0148881 | A1* | 6/2008 | Moniz | F02C 7/32 74/15.6 |
| 2010/0219779 | A1 | 9/2010 | Bradbrook | |

(Continued)

FOREIGN PATENT DOCUMENTS

WO        9502120        1/1995

OTHER PUBLICATIONS

European Patent Office, European Search Report dated Oct. 4, 2019 in Application No. 19177375.3.

*Primary Examiner* — Roger L Pang
(74) *Attorney, Agent, or Firm* — Snell & Wilmer, L.L.P.

(57) ABSTRACT

A power extraction and amplification system for a gas turbine engine is disclosed. In various embodiments, the power extraction and amplification system includes a low spool tower shaft configured for engagement with a low speed spool, a high spool tower shaft configured for engagement with a high speed spool, a first motor, a generator, a differential gear box operably coupled to the low spool tower shaft, to the first motor and to the generator, and a second motor operably coupled to the generator and the high spool tower shaft.

19 Claims, 8 Drawing Sheets

(56) References Cited

U.S. PATENT DOCUMENTS

| | | | |
|---|---|---|---|
| 2013/0247539 A1* | 9/2013 | Hoppe | F02C 7/32 |
| | | | 60/39.15 |
| 2014/0338352 A1* | 11/2014 | Edwards | F02C 3/113 |
| | | | 60/774 |
| 2017/0210478 A1* | 7/2017 | Mackin | B64D 15/12 |
| 2018/0045119 A1 | 2/2018 | Sheridan et al. | |
| 2018/0274449 A1* | 9/2018 | Anglin | F16H 57/023 |
| 2019/0353104 A1* | 11/2019 | Kupratis | F02C 7/36 |

* cited by examiner

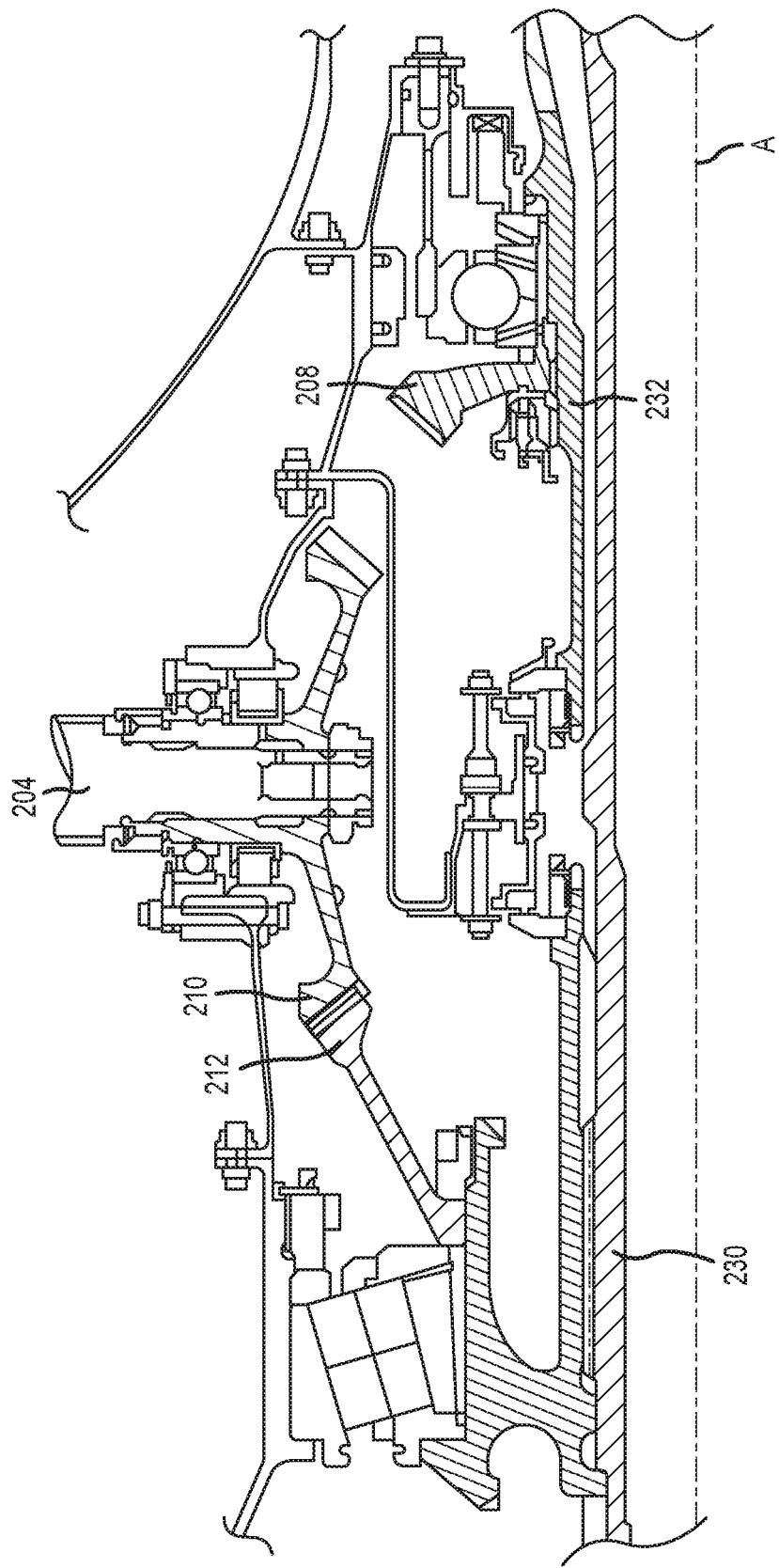

HYBRID AMPLIFICATION OF HIGH SPOOL MOTORING VIA LOW SPOOL POWER EXTRACTION AND MOTORING OF A DIFFERENTIAL GEARED GENERATOR

FIELD

The present disclosure relates generally to gas turbine engines and, more particularly, to gas turbine engines having amplified low spool power extraction for powering a high spool through use of a differential geared generator.

BACKGROUND

A gas turbine engine typically includes a fan section, a compressor section, a combustor section and a turbine section. Air entering the compressor section is compressed and delivered into the combustion section, where it is mixed with fuel and ignited to generate a high-speed exhaust gas flow. The high-energy exhaust gas flow expands through the turbine section to drive the compressor and the fan section. The compressor section typically includes low and high pressure compressors, and the turbine section includes low and high pressure turbines. The high pressure turbine drives the high pressure compressor through an outer shaft to form a high spool, and the low pressure turbine drives the low pressure compressor through an inner shaft to form a low spool. The fan section may also be driven by the low spool inner shaft, either directly or indirectly through a fan drive gear system.

Typical gas turbine engines are designed such that peak operational efficiency occurs when the engine is operated during one or both of takeoff or top of climb (alternately referred to as climb out) conditions. During these conditions, the gas turbine engine utilizes maximum amounts of thrust output of all operational modes. The efficiency designs impact the size of the engine components and the temperatures at which the engine components run during each phase of engine operations. Since the typical gas turbine engine is designed for peak efficiency during takeoff or top of climb, where the turbine inlet temperature approaches its maximum allowable limit for highest efficiency and thrust, the gas turbine engine is operated at lower efficiencies during other modes, such as cruise, where the turbine inlet temperature is below the maximum allowable limit. Hybrid engine designs may be employed to enhance engine operation while operating at otherwise lower efficiencies.

SUMMARY

A power extraction and amplification system for a gas turbine engine is disclosed. In various embodiments, the system includes a low spool tower shaft, a high spool tower shaft, a first motor, a generator, first means for coupling a low speed spool to the first motor and to the generator and second means for coupling a high speed spool to a second motor and to the generator.

In various embodiments, the first means for coupling the low speed spool to the first motor and to the generator includes a differential and the low spool tower shaft configured for engagement with the low speed spool. In various embodiments, the second means for coupling the high speed spool to the second motor and to the generator comprises the high spool tower shaft configured for engagement with the high speed spool. In various embodiments, the differential is a differential gear assembly configured to drive the generator. The generator is configured to power the second motor. In various embodiments, the second motor is configured to drive the high spool tower shaft.

In various embodiments, the first motor is operably coupled to the differential gear assembly via a first shaft and the generator is operably coupled to the differential gear assembly via a second shaft. In various embodiments, the generator is operably coupled to the second motor via an electric power cable. In various embodiments, the differential gear assembly includes a ring gear in meshing engagement with a bevel gear connected to the first shaft. In various embodiments, the first motor comprises one of a direct current motor and an alternating current motor and the second motor comprises one of a direct current motor and an alternating current motor.

A gas turbine engine is disclosed. In various embodiments, the gas turbine engine includes a high speed spool rotationally connecting a high pressure compressor and a high pressure turbine, a low speed spool rotationally connecting a low pressure compressor and a low pressure turbine, a low spool tower shaft configured for engagement with the low speed spool, a high spool tower shaft configured for engagement with the high speed spool, a first motor, a generator, a differential gear assembly operably coupled to the low spool tower shaft, the first motor and the generator, and a second motor operably coupled to the generator and the high spool tower shaft.

In various embodiments, the low spool tower shaft is configured to provide a first power input to the differential gear assembly and the first motor is configured to provide a second power input to the differential gear assembly. In various embodiments, the differential gear assembly is configured to drive the generator and the generator is configured to power the second motor. In various embodiments, the second motor is configured to drive the high spool tower shaft. In various embodiments, the first motor comprises one of a direct current motor and an alternating current motor and the second motor comprises one of a direct current motor and an alternating current motor.

A gas turbine engine is disclosed. In various embodiments, the gas turbine engine includes a high speed spool rotationally connecting a high pressure compressor and a high pressure turbine, a low speed spool rotationally connecting a low pressure compressor and a low pressure turbine, a first low spool tower shaft configured for engagement with the low speed spool, a high spool tower shaft configured for engagement with the high speed spool, a first differential gear assembly operably coupled to the first low spool tower shaft and to a first motor and to a first generator, a high spool tower shaft motor operably coupled to the high spool tower shaft and to the first generator.

In various embodiments, the gas turbine engine further includes a second low spool tower shaft configured for engagement with the low speed spool and a second differential gear assembly operably coupled to the second low spool tower shaft and to a second motor and to a second generator. In various embodiments, the high spool tower shaft motor is operably coupled to the first generator and the second generator. In various embodiments, the first generator provides a first power output to the high spool tower shaft motor at a first phase and the second generator provides a second power output to the high spool tower shaft motor at a second phase. In various embodiments, the high spool tower shaft motor is a brushless direct current motor. In various embodiments, the gas turbine engine further includes a controller configured to adjust a phase difference between the first phase and the second phase.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 2B and 2C are expanded sectional schematic views of the tower shaft arrangement illustrated in FIG. 2A, in accordance with various embodiments;

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
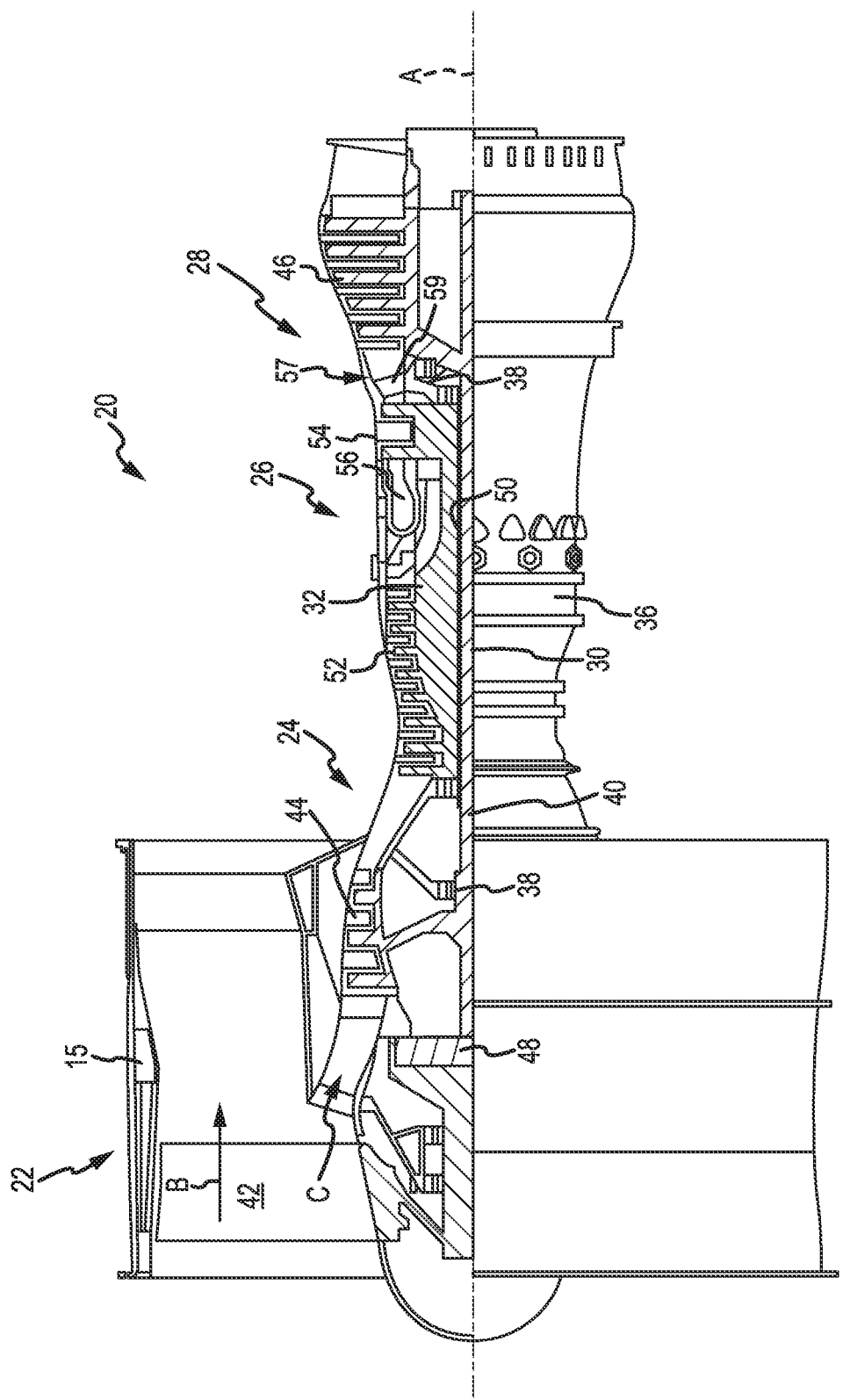
FIG. 1 is a cross sectional schematic view of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a primary or core flow path C for compression and communication into the combustor section 26 and then expansion through the turbine section 28. Although depicted as a two-spool turbofan gas turbine engine in the disclosed non-limiting embodiment, it will be understood that the concepts described herein are not limited to use with two-spool turbofans as the teachings may be applied to other types of turbine engines, including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with their longitudinal axes. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the fan drive gear system 48.

During operation of the gas turbine engine 20, the air in the core flow path is compressed by the low pressure compressor 44 and then the high pressure compressor 52, mixed and burned with fuel in the combustor 56, and then expanded over the high pressure turbine 54 and low pressure turbine 46. The low pressure turbine 46 and the high pressure turbine 54 rotationally drive the respective low speed spool 30 and the high speed spool 32 in response to the expansion. As will be described in further detail below, the low speed spool 30 may be engaged with and configured to drive a low spool tower shaft and the high speed spool 32 may be engaged with and configured to be driven by a high spool tower shaft. The low spool tower shaft and the high spool tower shaft may be engaged with motors, generators and a differential gear box, collectively configured for power extraction, amplification and redistribution within and among the various components of the gas turbine engine 20.

Figure 2A:
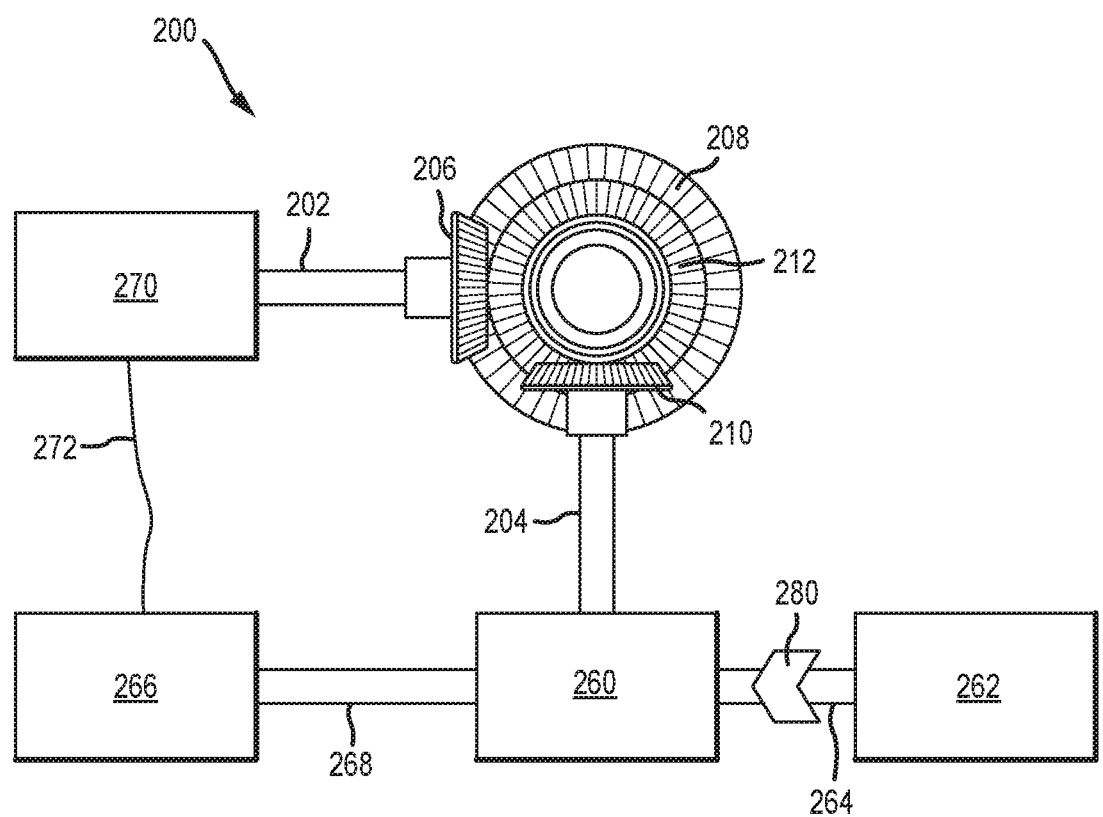
FIG. 2A is an axial schematic view of a tower shaft arrangement, coupled to electric motors, a generator and a differential gear box, in accordance with various embodiments.
Figure 2B:
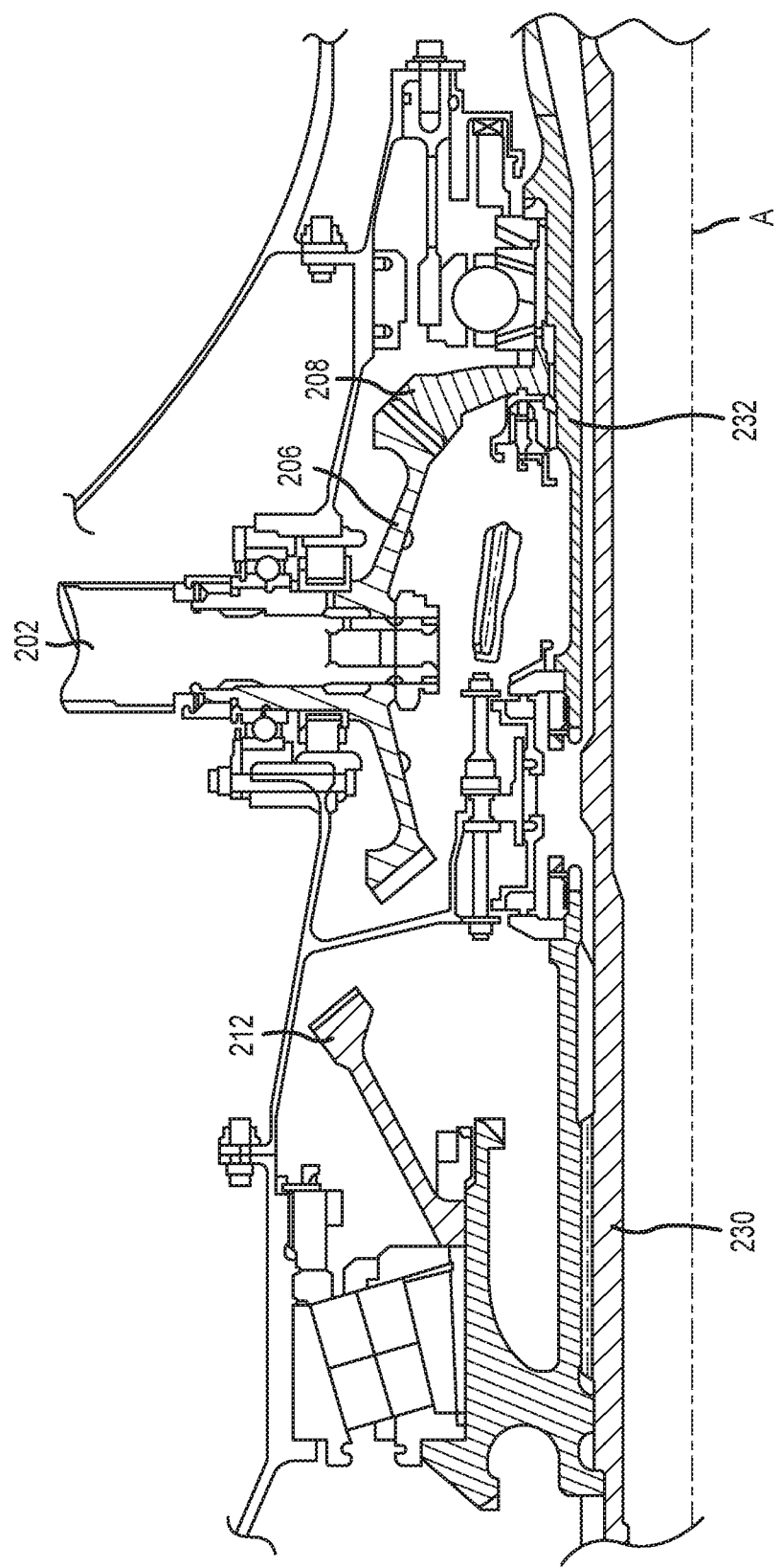

Referring now to FIGS. 2A, 2B and 2C, a power extraction and amplification system 200 is illustrated, in accordance with various embodiments. The power extraction and amplification system 200 includes a high spool tower shaft 202 and a low spool tower shaft 204. In various embodiments, the high spool tower shaft 202 includes a high spool bevel gear 206 in meshing engagement with a high spool gear pedestal 208. The high spool gear pedestal 208 is coupled to a high speed spool 232 (see FIG. 2B), such as the high speed spool 32 described above with reference to FIG. 1. Similarly, the low spool tower shaft 204 includes a low spool bevel gear 210 in meshing engagement with a low spool gear pedestal 212. The low spool gear pedestal 212 is coupled to a low speed spool 230 (see FIG. 2C), such as the low speed spool 30 described above with reference to FIG. 1. In various embodiments, the high spool gear pedestal 208 and the low spool gear pedestal 212 are mounted on the high speed spool 232 and the low speed spool 230, respectively.

With continued reference to FIGS. 2A, 2B and 2C, the low spool tower shaft 204 is coupled to a differential gear box 260. In various embodiments, the low spool tower shaft 204 is driven by the low speed spool 230 and, thereby, extracts power from the low speed spool 230, which provides a first power input to the differential gear box 260. The differential gear box 260 is connected to a first motor 262 via a first motor output shaft 264 and to a generator 266 via a generator input shaft 268. The generator 266 is connected to a second motor 270 via an electrical power cable 272 which, in various embodiments, may be configured to provide single or multiphase current power transfer. The second motor 270 is connected to the high speed spool 232 via the high spool tower shaft 202 and is used to provide a power input to the high speed spool 232. As will be discussed further below, in various embodiments, the first motor 262 provides a second power input to the differential gear box 260, which serves to amplify the first power input through the power output to the generator 266 via the generator input shaft 268. In various embodiments, a clutch 280, such as, for example, a sprag clutch, is incorporated into the first motor output shaft 264.

In various embodiments, the first motor 262, the generator 266 and the second motor 270 may comprise one or more of alternating current motors and generators and direct current motors and generators. In various embodiments, the first motor 262 is a direct current motor that includes brushes and a commutator. In various embodiments, the first motor 262 is a brushless direct current motor. In various embodiments, the second motor 270 is a direct current motor that includes brushes and a commutator. In various embodiments, the second motor 270 is a brushless direct current motor. In various embodiments, the generator is a direct current generator configured to supply direct current to the second motor 270 via the electrical power cable 272.

Figure 3A:
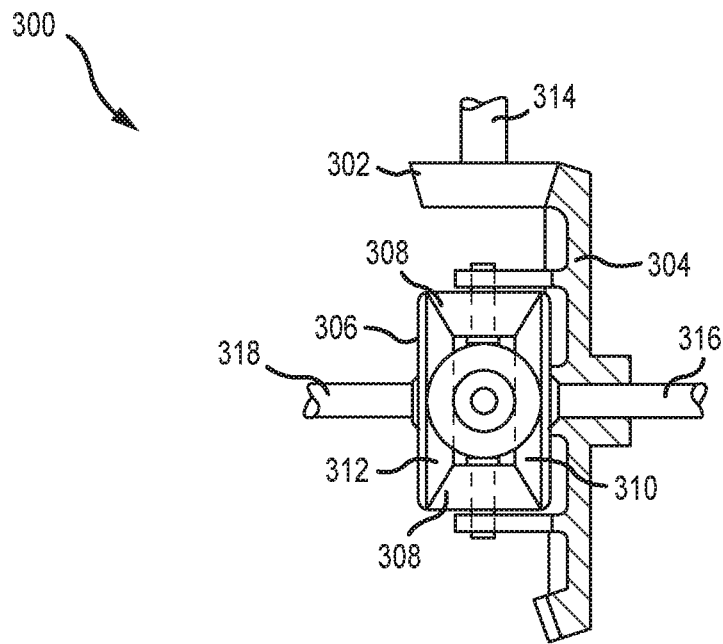
FIG. 3A is a schematic view of a differential gear assembly, in accordance with various embodiments.

Referring now to FIG. 3A, a differential gear assembly 300, such as that contained within the differential gear box 260 described above with reference to FIG. 2A, is illustrated. In various embodiments, the differential gear assembly 300 includes a first drive gear 302, a ring gear 304, a carrier 306, planet gears 308, a second drive gear 310 and a driven gear 312. In various embodiments, the first drive gear 302 is connected to and driven by a first input shaft 314, such as the low spool tower shaft 204, described above with reference to FIGS. 2A and 2C. The first drive gear 302 is also in meshing engagement with the ring gear 304. The second drive gear 310 is connected to and driven by a second input shaft 316, such as the first motor output shaft 264, described above with reference to FIG. 2A. The second drive gear 310 is also in meshing engagement with the planet gears 308, which are in rotational engagement with the carrier 306. The driven gear 312 is connected to and drives an output shaft 318, such as the generator input shaft 268 described above with reference to FIG. 2A.

Figure 3B:
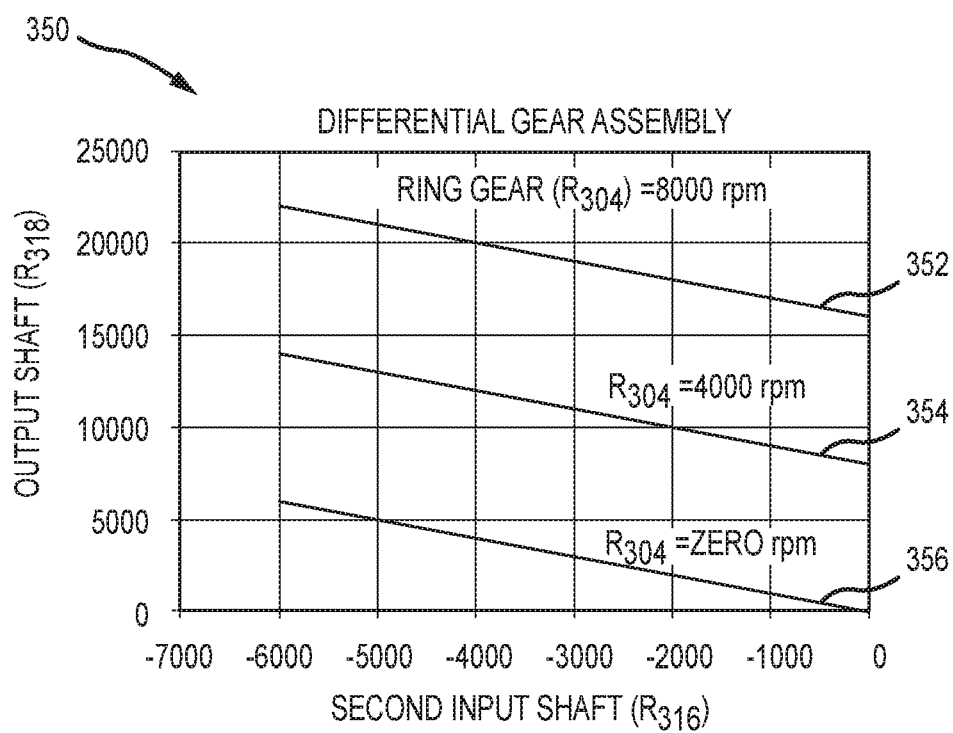
FIG. 3B is a graph depicting input and output speeds of the differential gear assembly illustrated in FIG. 3A, in accordance with various embodiments.

Referring now to both FIGS. 3A and 3B, the differential gear assembly 300 operates similar to an automotive differential. For example, in various embodiments, the number of teeth on the first drive gear 302 may be $N_{302}$ and the number of teeth on the ring gear 304 may be $N_{304}$, thereby providing a mesh ratio equal to $N_{302}/N_{304}$. In various embodiments, the rotational speed of the second input shaft 316, $R_{316}$, and the rotational speed of the output shaft 318, $R_{318}$, are related to the rotational speed of the ring gear 304, $R_{304}$, by the differential gear relation $(R_{318}+R_{316})/2=R_{304}$. The differential gear relation, $(R_{318}+R_{316})/2=R_{304}$ may be expressed in terms of the rotational speed of the first input shaft 314, $R_{314}$, through use of the mesh ratio, $N_{302}/N_{304}$, such that $(R_{318}+R_{316})/2=R_{314}$ $(N_{302}/N_{304})$. These relations are employed below to illustrate the amplification (e.g., increase in rotational speed) of the output shaft 318 by driving the second input shaft 316 in a direction opposite that of the ring gear 304 (or that of the output shaft 318). Referring again to FIG. 2A, the same relations illustrate the amplification (e.g., increase in rotational speed) of the generator input shaft 268 by driving the first motor output shaft 264 in a direction opposite that of a ring gear housed within the differential gear box 260 (or that of the generator input shaft 268).

Referring now to FIG. 3B, a graph 350 is provided illustrating amplification of the first power input—e.g., through the first input shaft 314—by driving the second input shaft 316 in a direction opposite the rotational direction of the ring gear 304. The x-axis represents the rotational speed of the second input shaft 316, $R_{316}$, and the y-axis represents the rotational speed of the output shaft 318, $R_{318}$. Three linear lines are also provided to represent different rotational speeds of the ring gear 304, $R_{304}$. By way of example, in various embodiments, the first input shaft 314 may rotate at $R_{314}$=24,000 rpm, thereby driving the ring gear 304 at a rotational speed of $R_{304}=R_{314}$ $(N_{302}/N_{304})$. If $(N_{302}/N_{304})$ is assumed equal to ⅓ (≈0.333), then $R_{304}$=8,000 rpm. Referring to the graph 350, a first linear line 352 represents the effect on $R_{318}$ by $R_{316}$ at constant $R_{304}$. As seen from the graph 350, for example, where $R_{304}$=8,000 rpm and $R_{316}$=0 rpm, the rotational speed of the output shaft 318 is $R_{318}$=16,000 rpm. As the rotational speed of the second input shaft 316 increases, in the reverse direction of the direction of rotation of the ring gear 304, the rotational speed of the output shaft 318 increases. As seen from the graph 350, for example, where $R_{304}$=8,000 rpm and $R_{316}$=negative 6000 rpm, the rotational speed of the output shaft 318 increases to $R_{318}$=22,000 rpm. The above description is now applied to the schematic examples that follow. A second linear line 354 and a third linear line 356 represent the effect on $R_{318}$ by $R_{316}$ at different constant speeds $R_{304}$ of the ring gear 304.

Figure 4:
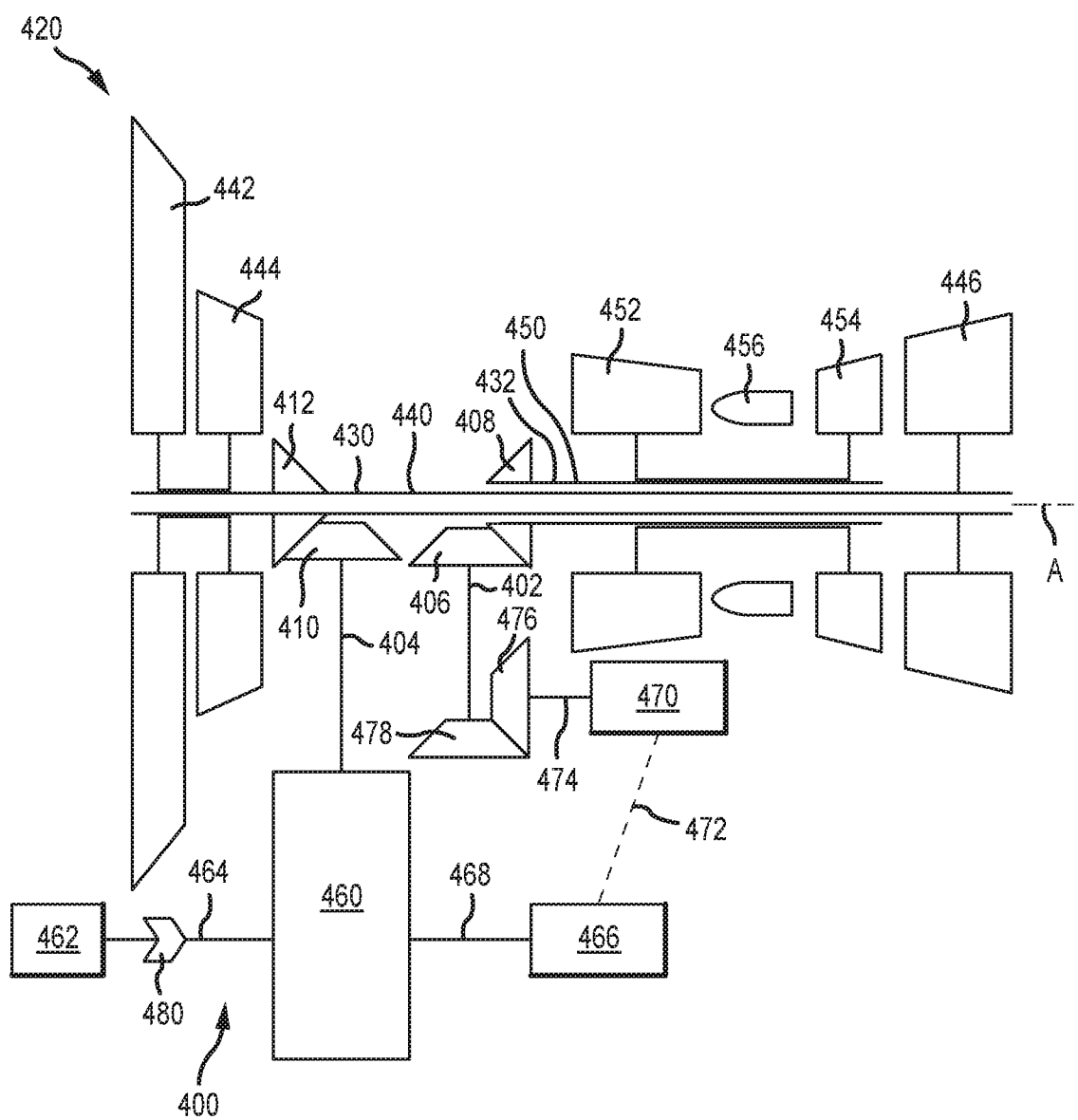
FIG. 4 is a schematic diagram of a gas turbine engine, in accordance with various embodiments.

Referring now to FIG. 4, a schematic diagram of a gas turbine engine 420 is provided, in accordance with various embodiments. Similar to the description above with reference to FIG. 1, the gas turbine engine 420 generally includes a low speed spool 430 and a high speed spool 432 mounted for rotation about an engine central longitudinal axis A. The low speed spool 430 generally includes an inner shaft 440 that interconnects a fan 442, a low pressure compressor 444 and a low pressure turbine 446. The high speed spool 432 includes an outer shaft 450 that interconnects a high pressure compressor 452 and a high pressure turbine 454. A combustor 456 is arranged in the gas turbine engine 420 between the high pressure compressor 452 and the high pressure turbine 454. The inner shaft 440 and the outer shaft 450 are concentric and rotate via bearing systems about the engine central longitudinal axis A, which is collinear with the longitudinal axes of the inner shaft 440 and the outer shaft 450.

The gas turbine engine 420 further includes a power extraction and amplification system 400. In various embodiments, the power extraction and amplification system 400 includes a high spool tower shaft 402 and a low spool tower shaft 404. In various embodiments, the high spool tower shaft 402 includes a high spool bevel gear 406 in meshing engagement with a high spool gear pedestal 408. The high spool gear pedestal 408 is coupled to the high speed spool 432, similar to the high speed spool 32 described above with reference to FIG. 1 and the high speed spool 232 described above with reference to FIGS. 2B and 2C. Similarly, the low spool tower shaft 404 includes a low spool bevel gear 410 in meshing engagement with a low spool gear pedestal 412. The low spool gear pedestal 412 is coupled to the low speed spool 430, similar to the low speed spool 30 described above with reference to FIG. 1 and the low speed spool 230 described above with reference to FIGS. 2B and 2C. In various embodiments, the high spool gear pedestal 408 and the low spool gear pedestal 412 are mounted on the high speed spool 432 and the low speed spool 430, respectively.

With continued reference to FIG. 4, the low spool tower shaft 404 is coupled to a differential gear box 460. In various embodiments, the low spool tower shaft 404 is driven by the low speed spool 430 and, thereby, extracts power from the low speed spool 430, which provides a first power input to the differential gear box 460. The differential gear box 460 is connected to a first motor 462 via a first motor output shaft 464 and to a generator 466 via a generator input shaft 468. The generator 466 is connected to a second motor 470 via an electrical power cable 472. The second motor 470 is connected to the high speed spool 432 via the high spool tower shaft 402 and is used to provide a power input to the high speed spool 432. In various embodiments, the second motor 470 is connected to the high spool tower shaft 402 via a second motor output shaft 474 and a first bevel gear 476 in meshing engagement with a second bevel gear 478, where the first bevel gear 476 is connected to the second motor output shaft 474 and the second bevel gear 478 is connected to the high spool tower shaft 402. In various embodiments, a clutch 480, such as, for example, a sprag clutch, is incorporated into the first motor output shaft 464. The clutch 480 prevents undesired turning of the first motor 462 by the differential gear box 460.

Similar to the description above with reference to FIGS. 2A, 2B and 2C and with reference to FIGS. 3A and 3B, the differential gear box 460 includes a differential gear assembly, such as the differential gear assembly described above with reference to FIGS. 3A and 3B. Accordingly, in various embodiments, the low spool tower shaft 404 is used to extract power from the low speed spool 430 and to provide a first power input into the differential gear box 460. A second power input is provided by the first motor 462 via the first motor output shaft 464. The first motor 462 is configured to drive the first motor output shaft 464 in a direction opposite that of a ring gear disposed within the differential gear box 460 or the generator input shaft 468. Thus, the first motor 462 may be used to amplify the power output of the differential gear box 460 that is supplied to the generator 466 via the generator input shaft 468. Electrical power produced by the generator 466 is then supplied to the second motor 470, which is used to drive the high spool tower shaft 402 and, thereby, the high speed spool 432.

Figure 5:
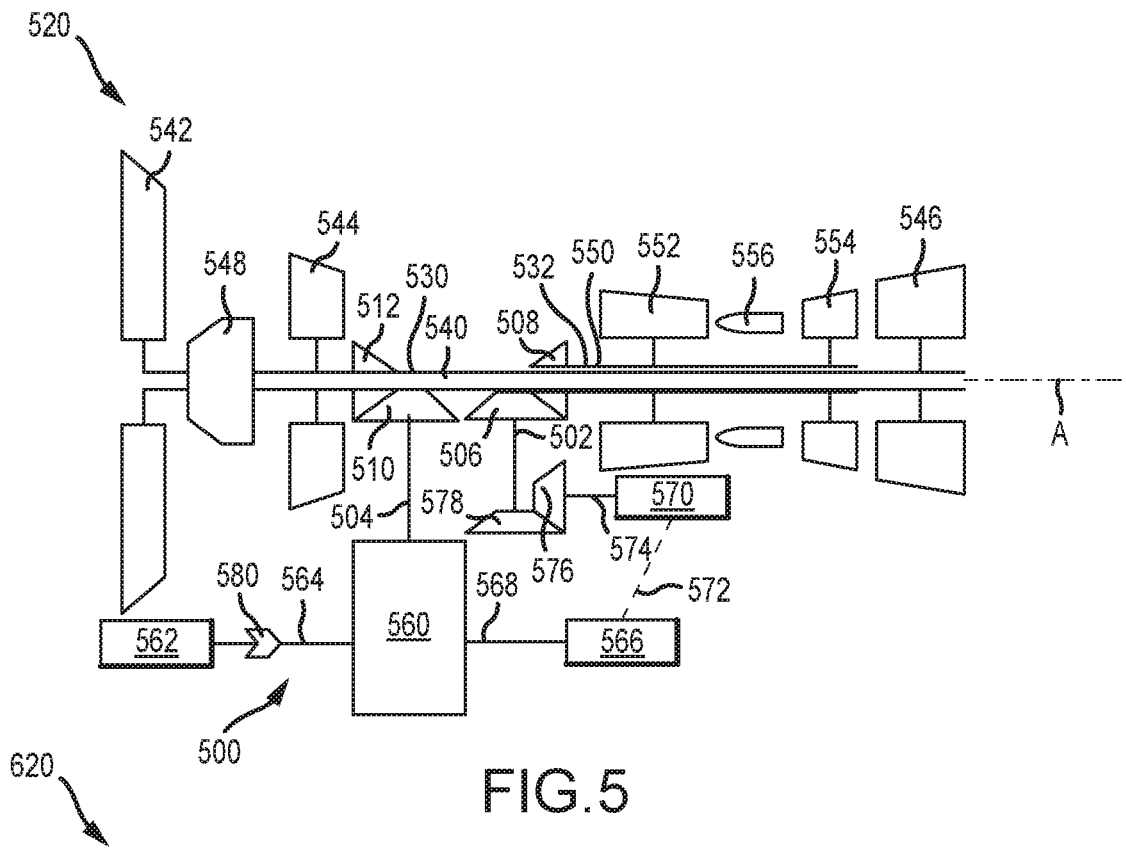
FIG. 5 is a schematic diagram of a gas turbine engine, in accordance with various embodiments.

Referring now to FIG. 5, a schematic diagram of a gas turbine engine 520 is provided, in accordance with various embodiments. Similar to the description above with reference to FIG. 4, the gas turbine engine 520 generally includes a low speed spool 530 and a high speed spool 532 mounted for rotation about an engine central longitudinal axis A. The low speed spool 530 generally includes an inner shaft 540 that interconnects a fan 542, a low pressure compressor 544 and a low pressure turbine 546. The inner shaft 540 is connected to the fan 542 through a speed change mechanism, which in this gas turbine engine 520 is illustrated as a fan drive gear system 548 configured to drive the fan 542 at a lower speed than the low speed spool 530. The high speed spool 532 includes an outer shaft 550 that interconnects a high pressure compressor 552 and a high pressure turbine 554. A combustor 556 is arranged in the gas turbine engine 520 between the high pressure compressor 552 and the high pressure turbine 554. The inner shaft 540 and the outer shaft 550 are concentric and rotate via bearing systems about the engine central longitudinal axis A, which is collinear with the longitudinal axes of the inner shaft 540 and the outer shaft 550.

The gas turbine engine 520 further includes a power extraction and amplification system 500. In various embodiments, the power extraction and amplification system 500 includes a high spool tower shaft 502 and a low spool tower shaft 504. In various embodiments, the high spool tower shaft 502 includes a high spool bevel gear 506 in meshing engagement with a high spool gear pedestal 508. The high spool gear pedestal 508 is coupled to the high speed spool 532, similar to the high speed spool 32 described above with reference to FIG. 1 and the high speed spool 232 described above with reference to FIGS. 2B and 2C. Similarly, the low spool tower shaft 504 includes a low spool bevel gear 510 in meshing engagement with a low spool gear pedestal 512. The low spool gear pedestal 512 is coupled to the low speed spool 530, similar to the low speed spool 30 described above with reference to FIG. 1 and the low speed spool 230 described above with reference to FIGS. 2B and 2C. In various embodiments, the high spool gear pedestal 508 and the low spool gear pedestal 512 are mounted on the high speed spool 532 and the low speed spool 530, respectively.

With continued reference to FIG. 5, the low spool tower shaft 504 is coupled to a differential gear box 560. In various embodiments, the low spool tower shaft 504 is driven by the low speed spool 530 and, thereby, extracts power from the low speed spool 530, which provides a first power input to the differential gear box 560. The differential gear box 560 is connected to a first motor 562 via a first motor output shaft 564 and to a generator 566 via a generator input shaft 568. The generator 566 is connected to a second motor 570 via an electrical power cable 572. The second motor 570 is connected to the high speed spool 532 via the high spool tower shaft 502 and is used to provide a power input to the high speed spool 532. In various embodiments, the second motor 570 is connected to the high spool tower shaft 502 via a second motor output shaft 574 and a first bevel gear 576 in meshing engagement with a second bevel gear 578, where the first bevel gear 576 is connected to the second motor output shaft 574 and the second bevel gear 578 is connected to the high spool tower shaft 502. In various embodiments, a clutch 580, such as, for example, a sprag clutch, is incorporated into the first motor output shaft 564 to prevent undesired turning of the first motor 562 by the differential gear box 560.

Similar to the description above with reference to FIGS. 2A, 2B and 2C and with reference to FIGS. 3A and 3B, the differential gear box 560 includes a differential gear assembly, such as the differential gear assembly described above with reference to FIGS. 3A and 3B. Accordingly, in various embodiments, the low spool tower shaft 504 is used to extract power from the low speed spool 530 and to provide a first power input into the differential gear box 560. A second power input is provided by the first motor 562 via the first motor output shaft 564. The first motor 562 is configured to drive the first motor output shaft 564 in a direction opposite that of a ring gear disposed within the differential gear box 560 or the generator input shaft 568. Thus, the first motor 562 may be used to amplify the power output of the differential gear box 560 that is supplied to the generator 566 via the generator input shaft 568. Electrical power produced by the generator 566 is then supplied to the second motor 570, which is used to drive the high spool tower shaft 502 and, thereby, the high speed spool 532.

Figure 6:
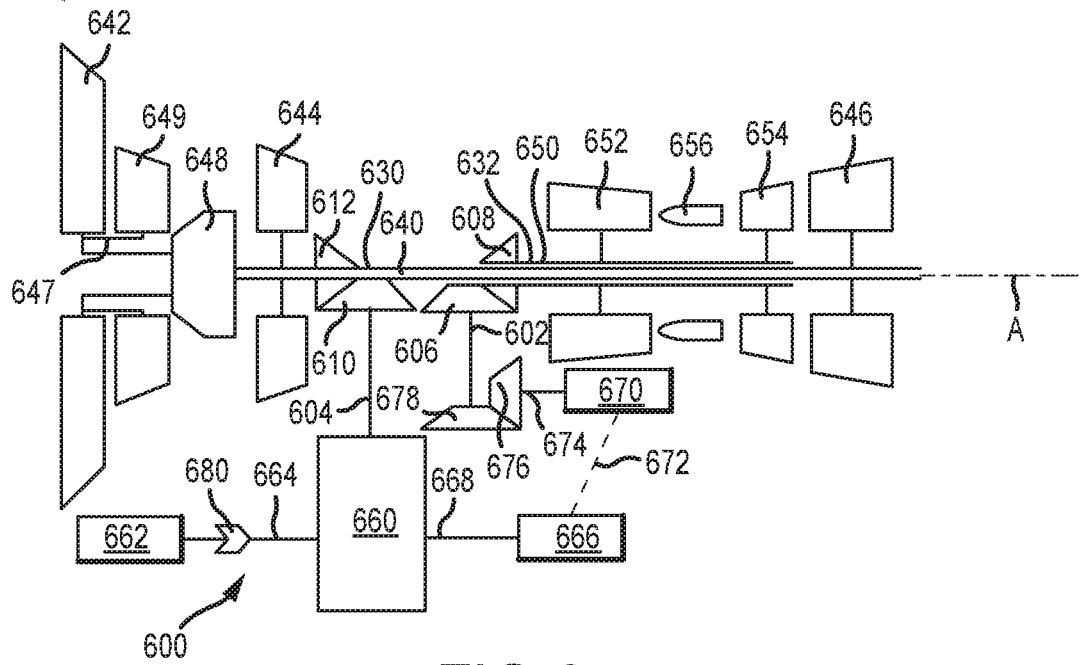
FIG. 6 is a schematic diagram of a gas turbine engine, in accordance with various embodiments.

Referring now to FIG. 6, a schematic diagram of a gas turbine engine 620 is provided, in accordance with various embodiments. Similar to the description above with reference to FIGS. 4 and 5, the gas turbine engine 620 generally includes a low speed spool 630 and a high speed spool 632 mounted for rotation about an engine central longitudinal axis A. The low speed spool 630 generally includes an inner shaft 640 that interconnects a fan 642, a low pressure compressor 644 and a low pressure turbine 646. The inner shaft 640 is connected to the fan 642 through a speed change mechanism, which in this gas turbine engine 620 is illustrated as a fan drive gear system 648 configured to drive the fan 642 at a lower speed than the low speed spool 630. The high speed spool 632 includes an outer shaft 650 that interconnects a high pressure compressor 652 and a high pressure turbine 654. A combustor 656 is arranged in the gas turbine engine 620 between the high pressure compressor 652 and the high pressure turbine 654. The inner shaft 640 and the outer shaft 650 are concentric and rotate via bearing systems about the engine central longitudinal axis A, which is collinear with the longitudinal axes of the inner shaft 640 and the outer shaft 650. In various embodiments, the gas turbine engine 620 also includes an inducer 649 (or inducer section) that comprises an additional compressor stage that is tied to the fan 642—e.g., the inducer 649 provides an additional compressor stage connected to a fan rotor 647, the fan rotor 647 providing a common rotor connecting both the fan 642 and the inducer 649. In various embodiments, the inducer 649 provides a controlled flow of air to the low pressure compressor 644.

The gas turbine engine 620 further includes a power extraction and amplification system 600. In various embodiments, the power extraction and amplification system 600 includes a high spool tower shaft 602 and a low spool tower shaft 604. In various embodiments, the high spool tower shaft 602 includes a high spool bevel gear 606 in meshing engagement with a high spool gear pedestal 608. The high spool gear pedestal 608 is coupled to the high speed spool 632, similar to the high speed spool 32 described above with reference to FIG. 1 and the high speed spool 232 described above with reference to FIGS. 2B and 2C. Similarly, the low spool tower shaft 604 includes a low spool bevel gear 610 in meshing engagement with a low spool gear pedestal 612. The low spool gear pedestal 612 is coupled to the low speed spool 630, similar to the low speed spool 30 described above with reference to FIG. 1 and the low speed spool 230 described above with reference to FIGS. 2B and 2C. In various embodiments, the high spool gear pedestal 608 and the low spool gear pedestal 612 are mounted on the high speed spool 632 and the low speed spool 630, respectively.

With continued reference to FIG. 6, the low spool tower shaft 604 is coupled to a differential gear box 660. In various embodiments, the low spool tower shaft 604 is driven by the low speed spool 630 and, thereby, extracts power from the low speed spool 630, which provides a first power input to the differential gear box 660. The differential gear box 660 is connected to a first motor 662 via a first motor output shaft 664 and to a generator 666 via a generator input shaft 668. The generator 666 is connected to a second motor 670 via an electrical power cable 672. The second motor 670 is connected to the high speed spool 632 via the high spool tower shaft 602 and is used to provide a power input to the high speed spool 632. In various embodiments, the second motor 670 is connected to the high spool tower shaft 602 via a second motor output shaft 674 and a first bevel gear 676 in meshing engagement with a second bevel gear 678, where the first bevel gear 676 is connected to the second motor output shaft 674 and the second bevel gear 678 is connected to the high spool tower shaft 602. In various embodiments, a clutch 680, such as, for example, a sprag clutch, is incorporated into the first motor output shaft 664 to prevent undesired turning of the first motor 662 by the differential gear box 660.

Similar to the description above with reference to FIGS. 2A, 2B and 2C and with reference to FIGS. 3A and 3B, the differential gear box 660 includes a differential gear assembly, such as the differential gear assembly described above with reference to FIGS. 3A and 3B. Accordingly, in various embodiments, the low spool tower shaft 604 is used to extract power from the low speed spool 630 and to provide a first power input into the differential gear box 660. A second power input is provided by the first motor 662 via the first motor output shaft 664. The first motor 662 is configured to drive the first motor output shaft 664 in a direction opposite that of a ring gear disposed within the differential gear box 660 or the generator input shaft 668. Thus, the first motor 662 may be used to amplify the power output of the differential gear box 660 that is supplied to the generator 666 via the generator input shaft 668. Electrical power produced by the generator 666 is then supplied to the second motor 670, which is used to drive the high spool tower shaft 602 and, thereby, the high speed spool 632.

Figure 7:
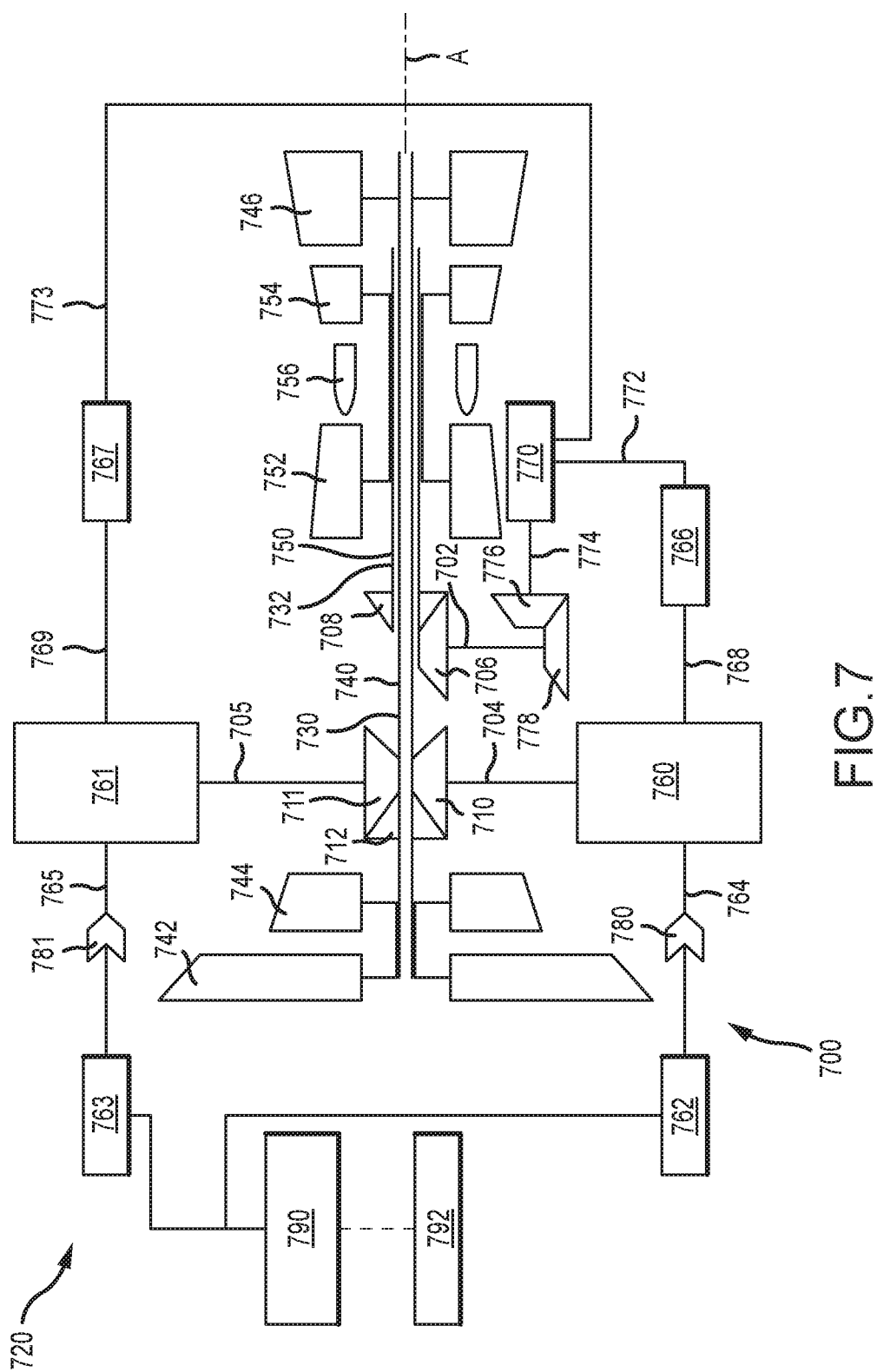
FIG. 7 is a schematic diagram of a gas turbine engine, in accordance with various embodiments.

Referring now to FIG. 7, a schematic diagram of a gas turbine engine 720 is provided, in accordance with various embodiments. Similar to the description above with reference to FIGS. 4, 5 and 6, the gas turbine engine 720 generally includes a low speed spool 730 and a high speed spool 732 mounted for rotation about an engine central longitudinal axis A. The low speed spool 730 generally includes an inner shaft 740 that interconnects a fan 742, a low pressure compressor 744 and a low pressure turbine 746. The high speed spool 732 includes an outer shaft 750 that interconnects a high pressure compressor 752 and a high pressure turbine 754. A combustor 756 is arranged in the gas turbine engine 720 between the high pressure compressor 752 and the high pressure turbine 754. The inner shaft 740 and the outer shaft 750 are concentric and rotate via bearing systems about the engine central longitudinal axis A, which is collinear with the longitudinal axes of the inner shaft 740 and the outer shaft 750.

The gas turbine engine 720 further includes a power extraction and amplification system 700. In various embodiments, the power extraction and amplification system 700 includes a high spool tower shaft 702, a first low spool tower shaft 704 and a second low spool tower shaft 705. In various embodiments, the high spool tower shaft 702 includes a high spool bevel gear 706 in meshing engagement with a high spool gear pedestal 708. The high spool gear pedestal 708 is coupled to the high speed spool 732, similar to the high speed spool 32 described above with reference to FIG. 1 and the high speed spool 232 described above with reference to FIGS. 2B and 2C. Similarly, the first low spool tower shaft 704 includes a first low spool bevel gear 710 in meshing engagement with a low spool gear pedestal 712 and the second low spool tower shaft 705 includes a second low spool bevel gear 711 in meshing engagement with the low spool gear pedestal 712. The low spool gear pedestal 712 is coupled to the low speed spool 730, similar to the low speed spool 30 described above with reference to FIG. 1 and the low speed spool 230 described above with reference to FIGS. 2B and 2C. In various embodiments, the high spool gear pedestal 708 and the low spool gear pedestal 712 are mounted on the high speed spool 732 and the low speed spool 730, respectively.

With continued reference to FIG. 7, the first low spool tower shaft 704 is coupled to a first differential gear box 760 and the second low spool tower shaft 705 is coupled to a second differential gear box 761. In various embodiments, the first low spool tower shaft 704 is driven by the low speed spool 730 and, thereby, extracts power from the low speed spool 730, which provides a first power input to the first differential gear box 760. The first differential gear box 760 is connected to a first motor 762 via a first motor output shaft 764 and to a first generator 766 via a first generator input shaft 768. The first generator 766 is connected to a high spool tower shaft motor 770 via a first electrical power cable 772. Similarly, the second low spool tower shaft 705 is driven by the low speed spool 730 and, thereby, extracts power from the low speed spool 730, which provides a first power input to the second differential gear box 761. The second differential gear box 761 is connected to a second motor 763 via a second motor output shaft 765 and to a second generator 767 via a second generator input shaft 769. The second generator 767 is connected to the high spool tower shaft motor 770 via a second electrical power cable 773.

In various embodiments, the high spool tower shaft motor 770 is connected to the high speed spool 732 via the high spool tower shaft 702 and is used to provide a power input to the high speed spool 732. In various embodiments, the high spool tower shaft motor 770 is connected to the high spool tower shaft 702 via a high spool tower shaft motor output shaft 774 and a first bevel gear 776 in meshing engagement with a second bevel gear 778, where the first bevel gear 776 is connected to the high spool tower shaft motor output shaft 774 and the second bevel gear 778 is connected to the high spool tower shaft 702. In various embodiments, a first clutch 780, such as, for example, a first sprag clutch, is incorporated into the first motor output shaft 764 to prevent undesired turning of the first motor 762 by the first differential gear box 760 and a second clutch 781, such as, for example, a second sprag clutch, is incorporated into the second motor output shaft 765 to prevent undesired turning of the second motor 763 by the second differential gear box 761.

Similar to the description above with reference to FIGS. 2A, 2B and 2C and with reference to FIGS. 3A and 3B, both the first differential gear box 760 and the second differential gear box 761 include a differential gear assembly, such as the differential gear assembly described above with reference to FIGS. 3A and 3B. Accordingly, in various embodiments, both the first low spool tower shaft 704 and the second low spool tower shaft 705 are used to extract power from the low speed spool 730 and to provide respective first power inputs into the first differential gear box 760 and the second differential gear box 761. Second power inputs are provided to the first differential gear box 760 and the second differential gear box 761, respectively, by the first motor 762 via the first motor output shaft 764 and the second motor 763 via the second motor output shaft 765. The first motor 762 is configured to drive the first motor output shaft 764 in a direction opposite that of a ring gear disposed within the first differential gear box 760 or the first generator input shaft 768. Thus, the first motor 762 may be used to amplify the power output of the first differential gear box 760 that is supplied to the first generator 766 via the first generator input shaft 768. Similarly, the second motor 763 may be used to amplify the power output of the second differential gear box 761 that is supplied to the second generator 767 via the second generator input shaft 769.

In various embodiments, the high spool tower shaft motor 770 is a brushless direct current motor. In various embodiments, one or both of the first generator 766 and the second generator 767 is a brushless direct current generator. Direct current power produced by the first generator 766 is supplied to the high spool tower shaft motor 770 at a first phase, Phase A. Similarly, direct current power produced by the second generator 767 is supplied to the high spool tower shaft motor 770 at a second phase, Phase B. In various embodiments, Phase A and Phase B are out of phase with each other, or exhibit a phase difference, such that a resulting torque is produced on the high spool tower shaft motor output shaft 774. In various embodiments, for example, the first generator 766 may be constructed using a permanent magnet rotor having four north and south poles and the second generator 767 may be constructed using a permanent magnet rotor having four north and south poles, with the poles in the first generator 766 and the second generator 767 being configured such that the power output is characterized by Phase B=Phase A+90°. The high spool tower shaft motor 770, according to various embodiments, may be constructed using a permanent magnet rotor having sixteen north and south poles, surrounded by a Phase A stator, powered by the first generator 766, and a Phase B stator, powered by the second generator 767, that are separated by ninety degrees (90°). The resulting configuration produces a torque on the high spool tower shaft motor output shaft 774 that is then used to drive the high spool tower shaft 702 and, hence, the high speed spool 732. In various embodiments, a motor control 790 or a full authority digital engine controller 792 is incorporated into the gas turbine engine 720 and employed to control operation of the first motor 762 and the second motor 763, thereby adjusting, for example, the phase relation between the first generator 766 and the second generator 767 and the amount of power supplied to the high speed spool 732.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A power extraction and amplification system for a gas turbine engine, comprising:
   a low spool tower shaft configured to engage a low speed spool;
   a high spool tower shaft;
   a first motor;
   a generator;
   a first coupling configured to couple the low speed spool to the first motor and to the generator, the first coupling including a differential and the low spool tower shaft; and
   a second coupling configured to couple a high speed spool to a second motor and to the generator.

2. The power extraction and amplification system of claim 1, wherein the second coupling configured to couple the high speed spool to the second motor and to the generator comprises the high spool tower shaft configured for engagement with the high speed spool.

3. The power extraction and amplification system of claim 2, wherein the differential is a differential gear assembly configured to drive the generator.

4. The power extraction and amplification system of claim 3, wherein the generator is configured to power the second motor.

5. The power extraction and amplification system of claim 4, wherein the second motor is configured to drive the high spool tower shaft.

6. The power extraction and amplification system of claim 5, wherein the first motor is operably coupled to the differential gear assembly via a first shaft and the generator is operably coupled to the differential gear assembly via a second shaft.

7. The power extraction and amplification system of claim 6, wherein the generator is operably coupled to the second motor via an electric power cable.

8. The power extraction and amplification system of claim 7, wherein the differential gear assembly includes a ring gear in meshing engagement with a bevel gear connected to the first shaft.

9. The power extraction and amplification system of claim 1, wherein the first motor comprises one of a direct current motor and an alternating current motor and the second motor comprises one of a direct current motor and an alternating current motor.

10. A gas turbine engine, comprising:
    a high speed spool rotationally connecting a high pressure compressor and a high pressure turbine;
    a low speed spool rotationally connecting a low pressure compressor and a low pressure turbine;
    a low spool tower shaft configured for engagement with the low speed spool;
    a high spool tower shaft configured for engagement with the high speed spool;
    a first motor;
    a generator;
    a differential gear assembly operably coupled to the low spool tower shaft, the first motor and the generator; and
    a second motor operably coupled to the generator and the high spool tower shaft.

11. The gas turbine engine of claim 10, wherein the low spool tower shaft is configured to provide a first power input to the differential gear assembly and the first motor is configured to provide a second power input to the differential gear assembly.

12. The gas turbine engine of claim 11, wherein the differential gear assembly is configured to drive the generator and the generator is configured to power the second motor.

13. The gas turbine engine of claim 12, wherein the second motor is configured to drive the high spool tower shaft.

14. The gas turbine engine of claim 13, wherein the first motor comprises one of a direct current motor and an alternating current motor and the second motor comprises one of a direct current motor and an alternating current motor.

15. A gas turbine engine, comprising:
    a high speed spool rotationally connecting a high pressure compressor and a high pressure turbine;
    a low speed spool rotationally connecting a low pressure compressor and a low pressure turbine;

a first low spool tower shaft configured for engagement with the low speed spool;

a high spool tower shaft configured for engagement with the high speed spool;

a first differential gear assembly operably coupled to the first low spool tower shaft and to a first motor and to a first generator; and a high spool tower shaft motor operably coupled to the high spool tower shaft and to the first generator.

16. The gas turbine engine of claim 15, further comprising:

a second low spool tower shaft configured for engagement with the low speed spool; and a second differential gear assembly operably coupled to the second low spool tower shaft and to a second motor and to a second generator, wherein the high spool tower shaft motor is operably coupled to the second generator.

17. The gas turbine engine of claim 16, wherein the first generator provides a first power output to the high spool tower shaft motor at a first phase and the second generator provides a second power output to the high spool tower shaft motor at a second phase.

18. The gas turbine engine of claim 17, wherein the high spool tower shaft motor is a brushless direct current motor.

19. The gas turbine engine of claim 18, further comprising a controller configured to adjust a phase difference between the first phase and the second phase.

* * * * *